Patented Oct. 30, 1928.

1,690,091

UNITED STATES PATENT OFFICE.

JOSEPH K. MARCUS, OF NEW YORK, N. Y.

PROCESS FOR EXTRACTING THE NONSAPONIFIABLE AND DIFFICULTLY-SAPONIFIABLE MATTER FROM FATTY MATERIAL.

No Drawing.   Application filed April 30, 1927.   Serial No. 188,048.

This invention relates to a process for extracting the non-saponifiable and difficultly saponifiable matter from fatty material, such as animal and vegetable oils and fats, or any fat-containing plant or animal tissue. Various animal and vegetable oils and fats contain anti-rachitic, anti-opthalmic and anti-sterility vitamins which are removable by extraction together with the other non-saponifiable and difficultly saponifiable matter of said material. It is one object of the invention to provide an improved process for treating fish liver oils, such as cod liver oil, to remove the non-saponifiable and difficultly saponifiable matter therefrom in concentrated form and in full possession of the combined vitamin potency of the original oil.

Another object of the invention is to provide an improved process in which the non-saponifiable and the difficultly saponifiable matter can be extracted from the alkali soap of the fatty material directly (that is, without either drying the soap, as formed, to remove its water, or dissolving it in water to form a solution) with the avoidance of troublesome emulsions, and in a commercially practical manner, the extraction being effected by the use of a suitable organic chloride, as, for example, ethylene dichloride. A further object of the invention is to provide an improved process of the character described including novel steps in the extraction whereby efficient factory production is made possible by the use of a substantially non-inflammable solvent, and by the presence, during extraction, of small volumes of water and alcohol as compared with other known processes.

Other parts of the invention will in part be obvious and in part hereinafter be pointed out.

The invention accordingly consists of features which will be exemplified in the process herein described and of which the scope of application will be indicated in the following claims.

An improved process embodying the invention will be described as applied to the treatment of cod liver oil for removing the non-saponifiable and the difficultly saponifiable matter therefrom in concentrated form and in full possession of the vitamin potency of the original oil.

Heretofore the method of preparing the alalkali soap of an oil for extraction of the unsaponifiable matter has been either by (a) dissolving the soap in a large excess of water, or (b) converting the alcoholic soap solution to dry soap by distilling off the solvent and drying the residue. The objection to method (a) is the necessity of handling such large volumes of material. The objections to method (b) are the troublesome step in the operation requiring the drying of the soap prior to the extraction, and in cases where the vitamins are being extracted, the possible danger of destroying these compounds in the drying process.

In the process embodying the invention these objections are overcome as is apparent from the following description of the invention:—Cod liver oil is saponified preferably with an excess of about 10 to 15 percent of caustic potash in aqueous alcohol. After saponification is complete the water and alcohol content of the alkali soap mass is adjusted so that about 60 grams of 30 percent aqueous alcohol is present for each 100 grams of oil saponified. The result is a viscous-solid soap mass. This soap mass is then agitated with ethylene dichloride, in amount about twice the volume of oil saponified. The ethylene dichloride layer is heavier than the soap layer and separates to the bottom, and is drawn off. The extraction of the soap layer is repeated with new portions of ethylene dichloride until the extraction is complete. The combined ethylene dichloride layers are dried with a desiccant such as sodium sulphate, filtered, and the solvent removed in vacuo. A vitamin-potent, yellow-orange, semi-solid residue is obtained. The great convenience in extracting with a solvent heavier than the soap mixture, is that the soap mixture remains in the extraction vessel, ready for the next extraction with fresh solvent. In the known methods, where lighter-than-soap solvents are used, it is the soap layer that is drawn off and has to be returned to the extraction vessel after the solvent layer has been removed.

The alkali soap mixture containing the required content of water and alcohol, as specified above, may be obtained by either one of two methods, (1) saponifying the cod liver oil with alcoholic potash in the well known proportions, distilling off the excess alcohol after saponification is complete, and then adding the required amount of water, or (2) saponifying the cod liver oil with less alcohol than necessary to form a homogeneous solution of the reaction mixture (e. g. an amount of 50 percent aqueous alcohol equal to 40 percent of the weight of cod liver oil treated), and then adding the required amount of water after saponification is complete. Method (2) eliminates the operation of distilling off alcohol.

It should be noted that by the above procedures, cod liver oil is converted into a viscous-solid mixture of potash soap that can be forthwith (that is, without either drying the soap to remove its water, or dissolving the soap in water) extracted with a solvent like ethylene dichloride.

Viscous-solid soap designates a soap mass that contains a substantial amount of water which, as it varies, changes the state of the soap from a soft semi-solid to a hard solid in contradistinction to the dry solid soap obtained by drying the soap mass.

The ethylene dichloride layers, after treatment with a desiccant and subsequent filtration, are free of dissolved soap. This is a noteworthy improvement over the known methods, in which the solvents used for extracting the unsaponifiable matter from the soap solutions extract also some soap, which has to be subsequently removed by repeatedly washing the solvents with water.

The amount of aqueous alcohol present in the potash soap mixture obtained from cod liver oil can be varied within fairly wide limits, giving viscous-solid soaps of various degrees of softness, and still permit of successful extraction of the unsaponifiable matter with ethylene dichloride. Thus, 85 grams of 25 percent aqueous alcohol for each 100 grams of cod liver oil saponified has given good results. So has 35 grams of 3 percent aqueous alcohol for each 100 grams of oil treated.

As has already been described above, the alkali soap mixture containing the content of water and alcohol as required for extraction with ethylene dichloride, may be obtained by either one of two methods. Method (2) can be varied so that a much smaller amount of water and alcohol is used for the saponification of the oil and for the extraction with ethylene dichloride. In carrying out this modified method, each 130 grams of potassium hydroxide is dissolved in 75 cubic centimeters of water, and to this solution, while warm, is added 500 grams of cod liver oil. While stirring, 5 cubic centimeters of alcohol is added to this mixture. An exothermic reaction takes place, with conversion of the oil to soap. When the temperature of the mixture begins to fall, heat is supplied to keep the temperature around 60 degrees centigrade for about 40 minutes, with continuous stirring. A viscous-solid soap mixture is now present. Next, 50 cubic centimeters of water is added and stirred well into the mass. When the mass has cooled it is agitated with 1000 cubic centimeters of ethylene dichloride. The ethylene dichloride separates as the lower layer, being heavier than the soap, and is drawn off. In the next extraction 45 cubic centimeters of water is added in order to secure a more complete and rapid separation of the lower layer after agitation. No further addition of water is necessary in the subsequent extractions. The combined ethylene dichloride layers are dried with a desiccant, filtered and the solvent removed in vacuo. A vitamin potent residue is obtained as above described.

In this latter method there is present during the saponification step, 16 grams of about 6 percent alcohol for each 100 grams of cod liver oil saponified. Preparatory to extraction of the soap mixture with ethylene dichloride, water is added until 35 grams of 3 percent aqueous alcohol is present for each 100 grams of oil treated.

This method may also be applied to effecting the so-called "cold saponification" of oils which cannot be so saponified with concentrated aqueous alkali alone. "Cold saponification" is the exothermic reaction that takes place between certain oils and concentrated aqueous alkali at or near room temperature to form soaps. The new method described above is based on the presence of a small amount of alcohol which apparently acts as a catalytic agent. The amount of alcohol necessary is less than 1 percent of the weight of oil treated.

When vitamins are being sought, the operations should be carried out with exclusion of light and oxygen.

For preserving the vitamin concentrate, obtained as above described, it may be mixed with medicinal mineral oil, in which the vitamins are soluble. The mineral oil forms an excellent medium for preserving the vitamins against oxidative and other destructive influences and is a good vehicle for medication.

It will thus be seen that there is provided a process in which the several objects of this invention are achieved and which is well adapted to be carried out in a practical manner.

As other various possible methods embodying the above invention might be used, and as various changes might be made in the embodiments above set forth, it is to be understood that all matters herein set forth are to be interpreted as illustrative and not in the limiting sense.

Having thus described my invention, I claim as new and desire to secure by Letters Patent:

1. The process of extracting vitamins from fatty material, consisting in forming a viscous solid soap from said material and extracting said vitamins from the soap with ethylene dichloride.

2. A step in the process of extracting nonsaponifiable and difficultly saponifiable matter from fatty materials, consisting in treating a viscous solid alkali soap formed from said material with ethylene dichloride to extract said matter.

3. The process of treating oil to extract its vitamin content, consisting in adding to the oil an alkali and aqueous alcohol to form a viscous-solid soap mass and extracting said mass with ethylene dichloride.

4. The process of extracting the vitamin contents from oil, consisting in saponifying the oil with an alkali in the presence of aqueous alcohol to form a soap and extracting said contents from the soap with ethylene dichloride, the aqueous alcohol content of the soap at the time of extraction being relatively less than the oil treated.

In testimony whereof I affix my signature.

JOSEPH K. MARCUS.